Nov. 15, 1966 B. A. PALMER 3,286,170
TRANSDUCER TESTING BY DIFFERENTIAL NON-LINEAR TECHNIQUES
Filed Sept. 5, 1963 5 Sheets-Sheet 1

INVENTOR
BRYAN ALBERT PALMER
BY
Morgan, Finnegan, Durham & Pine
ATTORNEYS

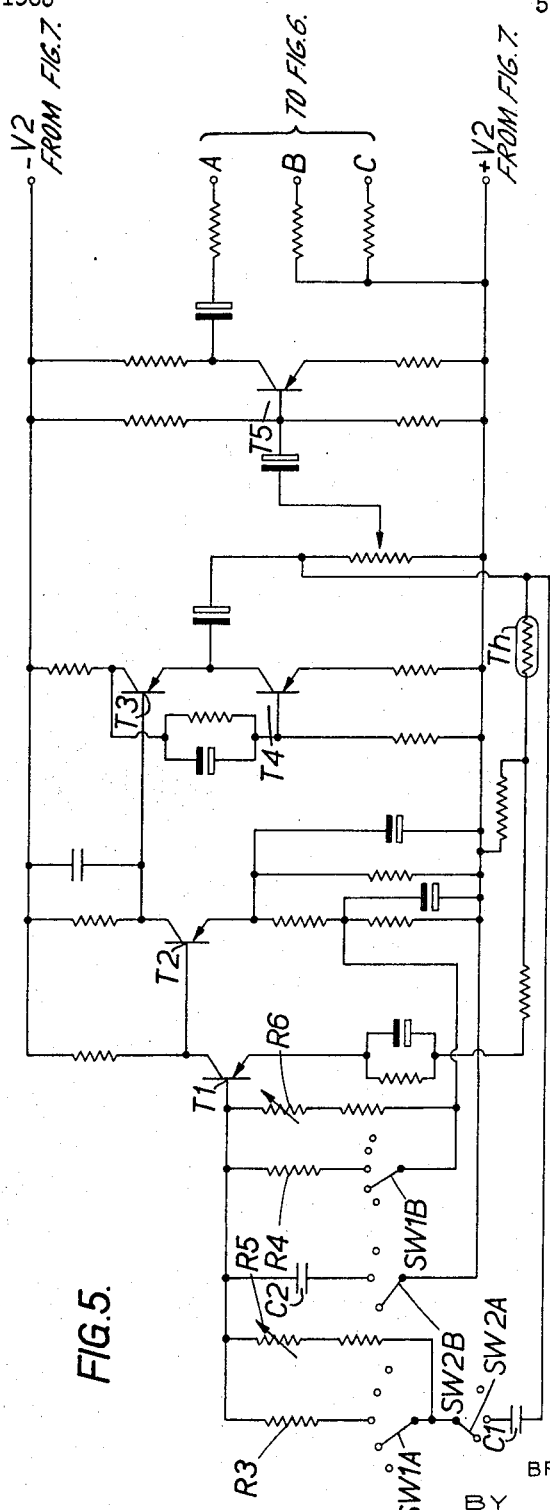

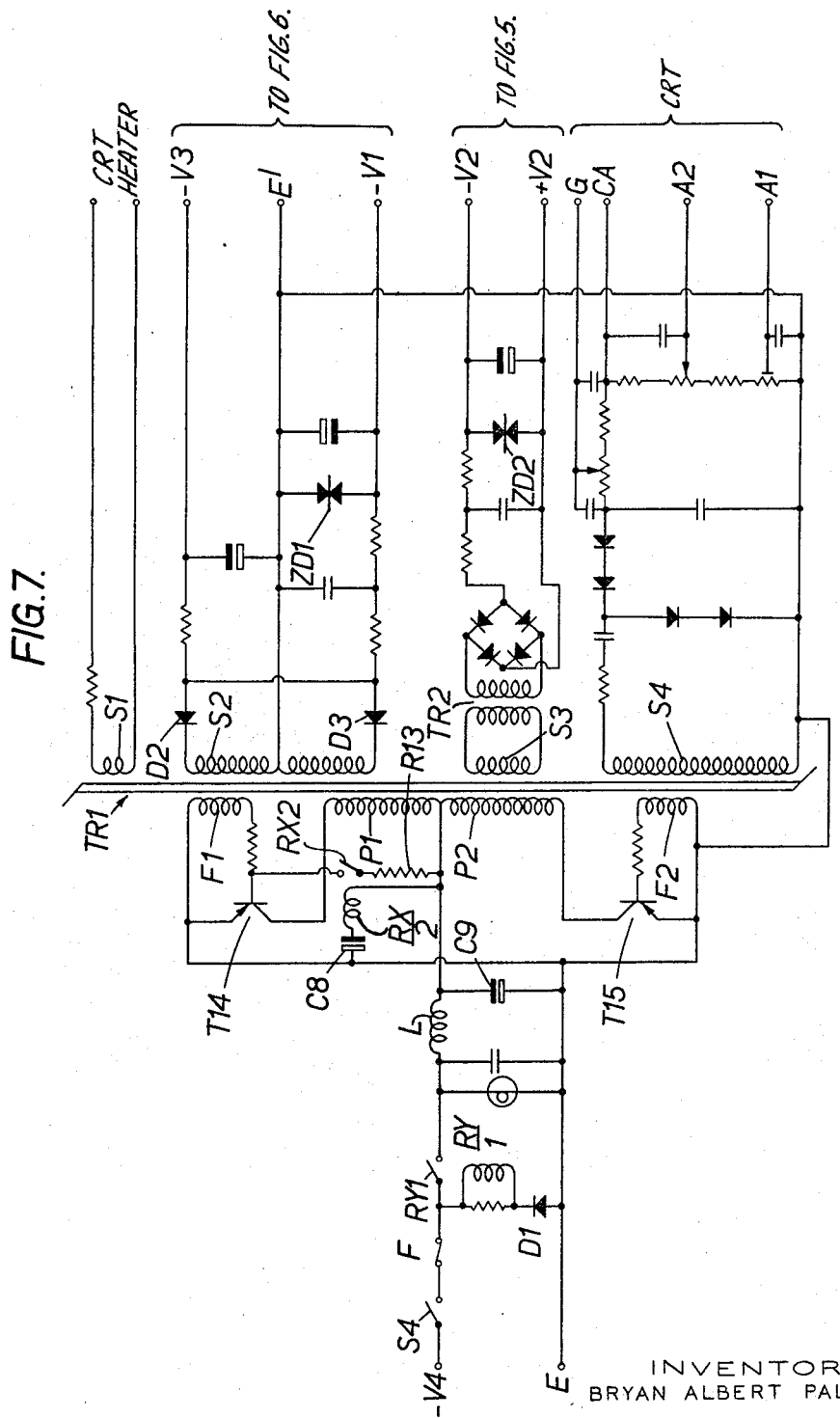

United States Patent Office 3,286,170
Patented Nov. 15, 1966

1

3,286,170
TRANSDUCER TESTING BY DIFFERENTIAL
NON-LINEAR TECHNIQUES
Bryan Albert Palmer, Sunbury-on-Thames, Middlesex,
England, assignor to The British Petroleum Company
Limited, London, England, a British joint-stock corporation
Filed Sept. 5, 1963, Ser. No. 306,918
Claims priority, application Great Britain, Nov. 29, 1962,
45,145/62
7 Claims. (Cl. 324—57)

This invention relates to techniques for testing transducers. For the purposes of this specification a "transducer" is any transducer which utilises the effect of relative movement between a coil and a magnet.

The apparatus described herein is especially useful for testing geophones and can be portable and therefore can be used in the field.

Conventional seismic exploration equipment usually comprises three components, geophones, amplifiers and a recorder. The amplifiers and recorder are subjected to rigorous acceptance tests, frequent routine checks and regular maintenance. The geophones on the other hand are only tested infrequently, or when suspected of being faulty. The absence of regular checking of the geophones is due, at least in part, to the lack of suitable testing equipment.

The performance of a geophone relies upon the values of three parameters. The first parameter is the natural frequency, $f_0$, which is the frequency of the moving mass of an undamped geophone when displaced from its neutral position and released. The second parameter is the damping factor, $h$, which is the ratio of the actual geophone damping to the crtical damping, the critical damping being the minimum damping which will allow no overswing when the moving mass is displaced and released. The third parameter is the sensitivity $K$ which is the electromotive force produced when the coil is moving with a velocity of one centimetre/second relative to the magnet.

For the purposes of explaining the testing of geophones electrically, a geophone can be represented by an electrical equivalent circuit as described in an article by Dr. A. T. Dennison, entitled, "The Design of Electromagnetic Geophones," in Geophysical Prospecting, vol. 1, No. 1, March 1953. The equivalent circuit as seen from the geophone terminals is an L-C-R combination which will in general have two resonant frequencies. At the lower resonant frequency (the natural frequency $f_0$) the circuit is a rejector circuit and has a high impedance, while at the higher resonant frequency ($f_1$) the circuit is an acceptor circuit and the impedance is low. By measuring the two resonant frequencies and the respective impedance at these frequencies the three parameters mentioned above can be calculated for the geophone. In practice the parameters are not calculated for each geophone as it is tested but a table showing ranges of acceptable resonant frequencies and corresponding impedances are referred to, to check the geophone is functioning satisfactorily.

It is an object of the present invention to provide techniques for electrically testing transducers, wherein the resonant frequencies thereof and the impedances at these frequencies can be easily and accurately determined.

According to the present invention we provide techniques for testing transducers including apparatus comprising a variable resistor arranged to be connected in series with a transducer to be tested, means for passing an alternating current, the frequency of which can be varied, through the series circuit including the variable resistor, means for introducing a small harmonic distortion into the voltages developed across the variable resistor and the transducer being tested, an adder for adding

2 the two distorted voltages to produce an output which contains only the sum of the harmonic distortions at a balance condition when the frequency of the alternating current is substantially equal to a resonant frequency of the transducer being tested and the value of the variable resistor is substantially equal to the impedance of the transducer at the resonant frequency, and means responsive to the output of the adder for indicating the signal content of said output, whereby the values of alternating current frequency and of the variable resistor can be substantially independently adjusted to produce the required balance condition.

By small harmonic distortion is meant distortion in the range 1% to 20% of the voltages. As the harmonic distortion is reduced the output signal is adversely affected by noise, either from the transducer under test or generated within the apparatus. The minimum acceptable signal to noise ratio determines the lower limit of the distortion. Increasing the harmonic distortion reduces the resolution of the apparatus. The minimum acceptable resolution sets the upper limit to the distortion.

A practical instrument would use amplifiers with harmonic distortion in the range 1–20%.

In order that the invention can be more clearly understood a specific embodiment thereof will hereinafter be described, by way of example only, with reference to the accompanying drawings, in which.

Figure 3A:
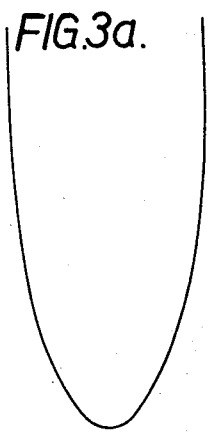
Figure 4A:
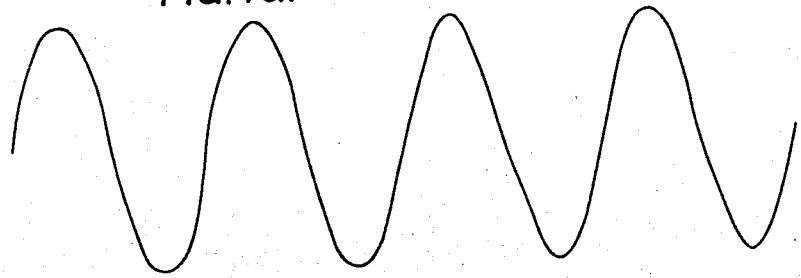
Figure 6:
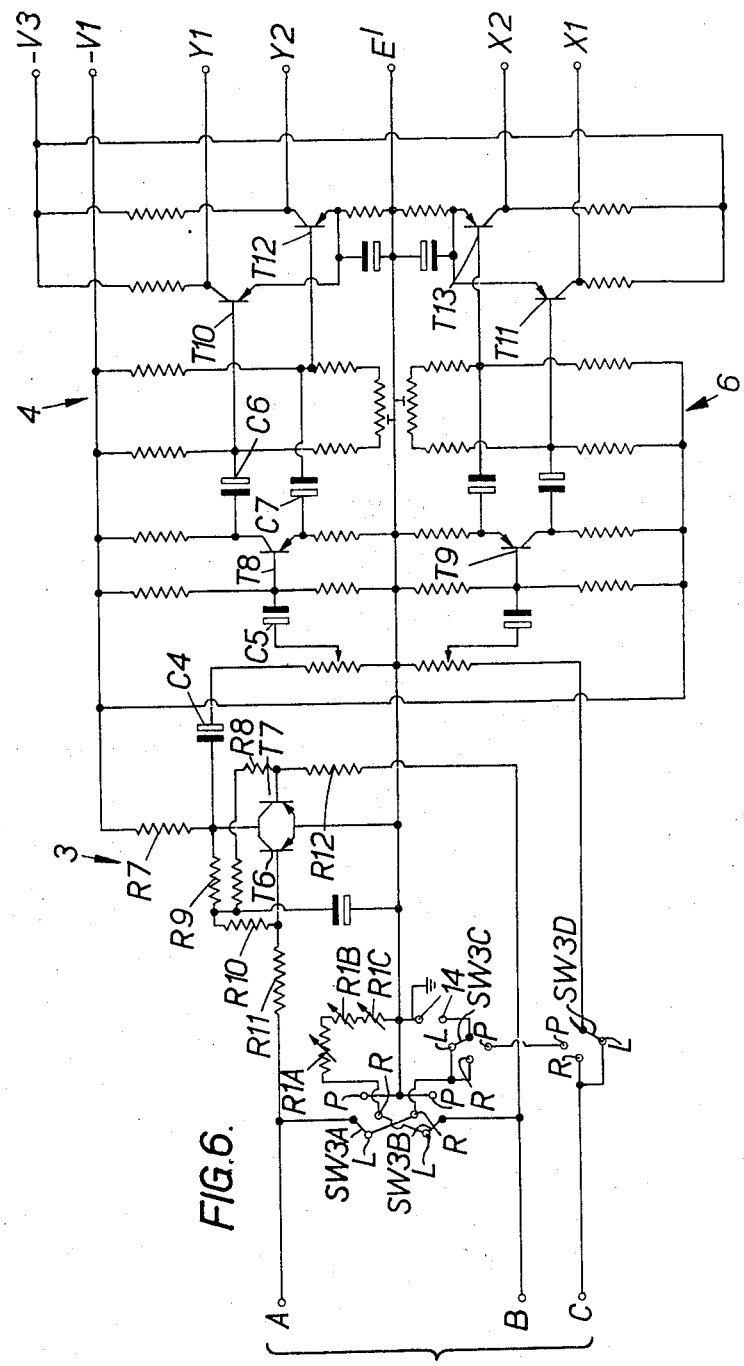

FIGURES 3a, b and c show typical traces as displayed on a cathode ray tube, of the apparatus, using a sine wave time base at fundamental frequency;

FIGURES 4a, b and c show typical traces as displayed on a cathode ray tube, of the apparatus, using a saw tooth time base;

FIGURE 5 shows a circuit diagram of the oscillator of the apparatus;

FIGURE 6 shows a circuit diagram of the adder and two amplifiers of the apparatus;

FIGURE 7 shows a circuit diagram of the power supply of the apparatus.

Figure 1:
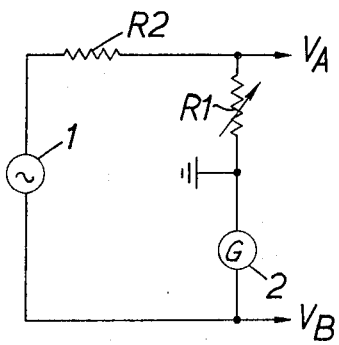
FIGURE 1 shows a simplified circuit diagram of part of the apparatus.

Referring firstly to FIGURE 1 there is shown a simplified circuit diagram of part of the apparatus, in which an alternating current source 1, the frequency of which can be varied, is connected to supply a variable resistor R1 and a geophone 2 connected in series. The geophone should be placed in its normal operating position. A resistor R2 of high value is connected in series with the alternating current source 1 to ensure that it is a current generator and not a voltage generator. The connection between the variable resistor R1 and the geophone 2 is taken to earth so that the voltage $V_A$ developed across the resistor 21 is of opposite polarity to the voltage $V_B$ developed across the geophone.

The voltages $V_A$ and $V_B$ are then amplified and a small percentage (1–20%) of harmonic distortion, conveniently second harmonic, is introduced. The two amplified voltages are then added; with the oscillator at either of the resonant frequencies of the geophone and with resistor R1 adjusted to equal the impedance at that resonant frequency the output of the adder comprises only the sum of the second harmonic distortions introduced.

Figure 2:
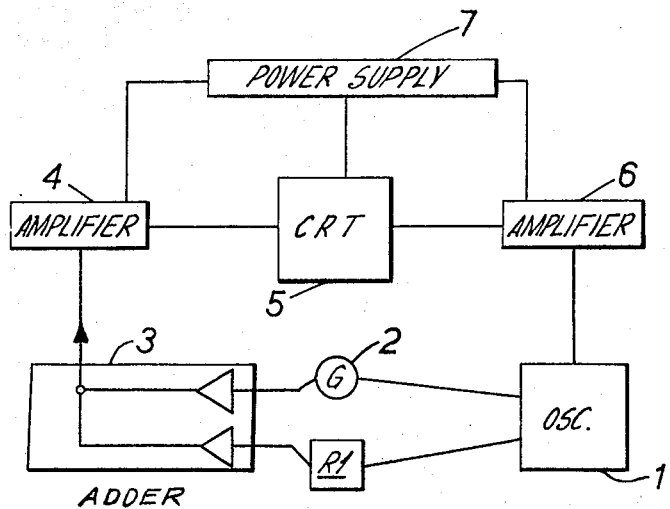
FIGURE 2 shows a block schematic representation of the apparatus.

FIGURE 2 shows a block schematic diagram of a complete testing apparatus. The oscillator 1 feeds a signal to the variable resistor R1 and the geophone 2. The voltages $V_A$ and $V_B$ are amplified, distorted and added in the adding unit 3. The resultant output is amplified by the amplifier 4 and fed to one set of deflection plates of the cathode ray tube 5. The output from the oscillator 1 is also fed via an amplifier 6 to the other set of deflector plates of the cathode ray tube 5. The necessary power supplies for the various units are produced by a power supply unit 7.

With the apparatus as shown in FIGURE 2 displays are produced on the screen of the C.R.T. 5 in the form of Lissajous figures as shown in FIGURES 3a, b and c. The Lissajous figure shown in FIGURE 3a is the display which is produced when the frequency emitted by the oscillator 1 is equal to a resonant frequency of the geophone and the value of variable resistor R1 is equal to the geophone impedance at that resonant frequency. This figure is produced by the voltage component on the X plates of the C.R.T. 5 being the fundamental; the voltage component on the Y plates being the second harmonic of the fundamental.

Figure 3B:
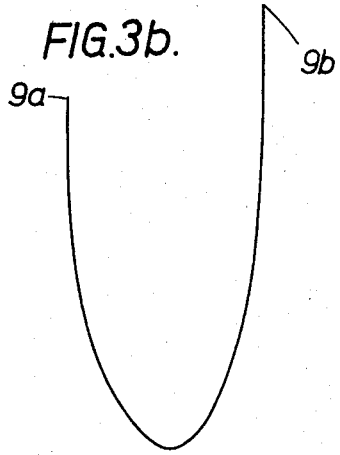

The Lissajous figure shown in FIGURE 3b is the display which is produced when the frequency emitted by oscillator 1 is equal to a resonant frequency of the geophone but the value of variable resistor R1 is not equal to the impedance of the geophone at that resonant frequency. With this condition the left hand horn 9a of the figure is out of horizontal alignment with the right hand horn 9b. This figure is produced by the voltage component on the X plates of the C.R.T. 5 being the fundamental; the voltage components on the Y plates being the second harmonic of the fundamental plus a much smaller amount of the fundamental.

Figure 3C:
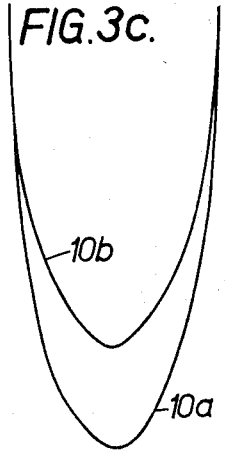

The Lissajous figure shown in FIGURE 3c is the display which is produced when the frequency emitted by oscillator 1 is not quite equal to a resonant frequency of the geophone but the value of variable resistor R1 is equal to the impedance of the geophone at that resonant frequency. With this condition the curve is divided to form an outer curve 10a and an inner curve 10b. This figure is produced by the voltage component on the X plates of C.R.T. 5 being the fundamental; the voltage components on the Y plates being the second harmonic of the fundamental, plus a small component of fundamental frequency which is approximately 90° out of phase with the applied fundamental, plus a much smaller component of fundamental frequency approximately in phase with the applied signal. This last component can be disregarded in practice.

From the above it can be seen that when a geophone is being tested it is immediately obvious to the operator whether the resistance or frequency values need to be adjusted. The detailed procedure for testing a geophone will be described hereinafter with reference to the circuits shown in FIGURES 5, 6 and 7.

FIGURES 4a, b and c show displays which are produced on the cathode ray tube screen using a conventional sawtooth timebase. In this case the output of the adder 3 (FIGURE 2) is applied to the Y plates via amplifier 4 and amplifier 6 is replaced by a sawtooth timebase generator unit (not shown) there being no connection between this unit and oscillator 1.

FIGURE 4a shows the display obtained when the frequency supplied from the oscillator 1 is equal to a resonant frequency of the geophone and the value of variable resistor R1 is equal to the impedance of the geophone at the resonant frequency. This display is a sine wave which is the second harmonic of the fundamental frequency.

Figure 4B:

FIGURE 4b shows the display obtained when the supply frequency is equal to a resonant frequency of the geophone but the value of variable resistor R1 is not equal to the impedance of the geophone at that resonant frequency. With this condition the voltage components forming the display are a sine wave which is the second harmonic of the fundamental frequency plus a small component of the fundamental frequency which is approximately in phase with the applied fundamental. The trace therefore has positive troughs of unequal amplitude.

Figure 4C:
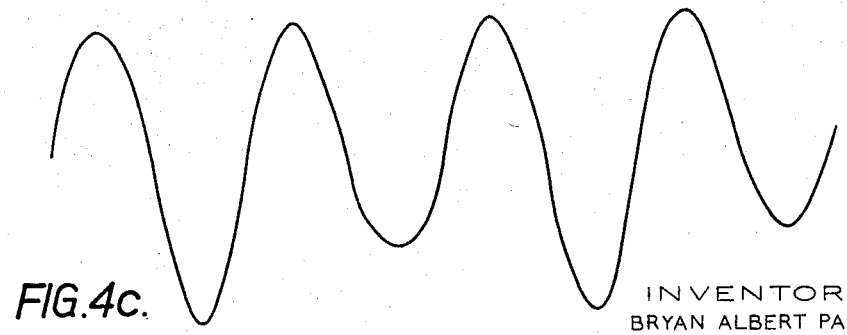

FIGURE 4c shows the display obtained when the supply frequency is not quite equal to a resonant frequency of the geophone and the value of the variable resistor R1 is equal to the impedance of the geophone at that resonant frequency. With this condition the voltage components forming the display are a sine wave which is the second harmonic of the fundamental frequency plus a small component of fundamental frequency which is approximately 90° out of phase with the applied fundamental. The trace therefore has negative troughs of unequal amplitude.

Hence it can be seen from the above that when testing a geophone the use of either of these displays shows whether frequency or resistance values require adjustment to achieve a balance condition.

Referring now to FIGURES 5, 6 and 7 there is shown the detailed circuits for the apparatus as shown in block schematic form in FIGURE 2. The circuits are all straightforward and therefore will not be described in detail.

The oscillator shown in FIGURE 5 is of the Wien bridge type with a frequency range of 1 to 1200 cycles per second in three ranges. The units of frequency (1 to 12) are determined by twelve resistors R3 and twelve resistors R4 (only one of each shown). The resistors R3 and R4, are selected by a two-pole twelve-way switch SW1 (only five positions shown), pole SW1A selecting the required resistor R3 and pole SW1B selecting the required resistor R4. The resistors R3 and R4 have different values at the different positions of switch SW1 and equal values at corresponding positions of switch SW1. The fractional values of frequency are obtained by adjusting the variable resistors R5 and R6 which are ganged. The three ranges of frequency ($x1$, $x10$ and $x100$) are determined by three capacitors C1 and three capacitors C2 (only one of each shown). The capacitors C1 and C2, are selected by a two-pole three way switch SW2, pole SW2A selecting the required capacitor C1 and pole SW2B selecting the capacitor C2. The capacitors have different values for the different positions of switch SW2 and equal values at corresponding positions of switch SW2.

Transistors T1 and T2 are connected as common emitter amplifiers while transistors T3 and T4 are connected as a linearised emitter follower. The output from this emitter follower is fed through a feedback loop, including the thermistor Th, to the bridge network. The output from T3 and T4 is also amplified by the transistor T5 and fed to the output terminals A, B and C which are connected to similarly referenced terminals on FIGURE 6.

The power supply for the oscillator is derived from terminals −V2 and +V2 which are connected to similarly referenced terminals on FIGURE 7. It should be noted that neither of the terminals −V2 or +V2 can be connected to earth as this would impair the operation of the adder by shunting either the resistor R1 or the geophone (FIGURE 1).

FIGURE 6 shows a circuit diagram of the adder 3 and the amplifiers 4 and 6 shown in FIGURE 2. The input terminals A, B and C are connected to the output terminals A, B and C of the oscillator shown in FIGURE 5. The variable resistor R1 is in the form of three variable resistors R1A, R1B and R1C connected in series so allowing coarse and fine adjustment of resistance values. A geophone to be tested is connected between terminals 14.

The resistor R1 and the geophone are connected in series and are supplied with alternating current via a four-pole three position switch SW3, the three positions being referenced L, R and P.

The positions L and R of the switch are provided so that the series circuit connection to the oscillator terminals A and B can be reversed via poles SW3A and SW3B of the switch. With the switch in position L the variable resistor R1 is connected to terminal B and with the switch in position R the variable resistor R1 is connected to terminal A. The position P of the switch disconnects the variable resistor R1 (poles SW3A and SW3B) and connects the geophone terminal 14 to the amplifier 6 (poles SW3C and SW3D). This position of the switch causes a display in the form of a spot to appear on the cathode ray tube screen. Displacement of the geophone coil causes the spot to move horizontally across the screen. The first swing of the spot is observed and a movement to the right indicates a positive voltage. This facility is provided to check the polarity of the geophone.

In operation with the switch in the L position the voltage developed across variable resistor R1 is fed to the base of a transistor T7 for amplification and distortion. The voltage developed across the geophone is fed to the base of a transistor T6 for amplification and distortion. The transistors T6 and T7 have their emitters connected to earth and their collectors connected to a common collector load resistor R7. The output voltage developed across resistor R7 is the vector sum of these amplified voltages plus the second harmonic distortion deliberately introduced into the amplification.

The gains of the two transistors T6 and T7 are adjusted to be equal by the pre-set resistor R8. the second harmonic distortion is introduced by biasing the transistors T6 and T7 onto the rounded part of their $V_b/I_c$ curve by means of the resistors R9 and R10. Connecting the variable resistor R1 and the geophone across the two inputs shunts the bias resistors and alters the collector voltage slightly. Resistors R11 and R12 are provided to reduce the shunting effect.

The resultant output voltage developed across resistor R7 is fed via coupling capacitors C4 and C5 to a first amplifying stage, transistor T8. The coupling capacitors in amplifiers 4 and 6 are all electrolytic and of high value (750 μf.). This is to ensure that the amplifiers have as small a phase shift as possible at frequencies as low as 2 cycles per second, so allowing low frequency geophones to be tested and still maintain adjustments of frequency and resistance substantially independent near the resonant frequencies.

The amplified output from transistor T8 is fed via coupling capacitors C6 and C7 and a simple distributed-load phase splitter 15, to two transistors T10 and T12 forming a second amplifying stage. The transistors T10 and T12 are connected in push-pull configuration to give an output comparable to class B operating conditions.

The outputs from amplifier 4 are fed to terminals Y1 and Y2 which are connected to the Y plates of the cathode ray tube (not shown).

The output from terminal C of the oscillator circuit is fed to amplifier 6, which is similar to amplifier 4, having a first amplifying stage including transistor T9 and a second push-pull amplifying stage including transistors T11 and T13. The outputs from amplifier 6 are fed to terminals X1 and X2 which are connected to the X plates of the cathode ray tube (not shown).

Terminals −V1 and −V3 are connected to corresponding terminals of the power supply circuit, shown in FIGURE 7, for deriving the power supply for the adder 3 and amplifier 4 and 6. Terminal E′ is connected to terminal E′ of the power supply circuit.

Referring now to FIGURE 7 there is shown the circuit for the power supply 7 of FIGURE 2. A 12 volt battery (not shown) is connected between terminals −V4 and E. A switch S4 is provided for completing the circuit to the battery. When switch S4 is actuated, current flows through relay RY/1 and diode D1 to energise the relay so completing a circuit via its contact RY1 to a D.C. converter comprising transistors T14, T15 and associated components. Relay RY/1 only operates when the battery is correctly connected to the terminals E and −V4.

While capacitor C8 is charging a current flows through relay RX/2 causing the contact RX2 to close. The resistor R13 is connected to the base T1 causing it to conduct. When capacitor C8 is fully charged the current through relay RX/2 will cease causing contact RX2 to open disconnecting R13 from the base of T1.

Transistor T14 causes the supply voltage to be fed across windings F1 and F2 of the transforme TR1. The voltage across winding P1 causes a voltage to appear across windings F1 and F2 of the transformer TH1. The polarity of winding F2 is such that the transistor T15 is held cut off. The number of turns and the polarity of winding F1 are such as to bottom the transistor T14.

The voltage across the primary winding P1 causes a linearly increasing current to flow until the transformer core saturates, causing the inductance of winding P1 to decrease. The current will then increase rapidly until the transistor is no longer bottomed. The voltage across winding P1 will fall so causing a reduction of the voltage across winding F1 until the voltages across windings F1 and F2 reverse polarity. The reversing of polarity causes transistor T14 to be cut off and transistor T15 to be turned on. The supply voltage is now connected across primary winding P2. This process is repeated with transistors T14 and T15 connecting the supply alternately across primary windings P1 and P2.

Hence a voltage square wave is produced across primary windings P1 and P2, and consequently induced in secondary windings S1, S2, S3 and S4 of the transformer TR1.

Inductance L and capacitor C9 are provided to reduce current spikes appearing on the supply voltage due to the converter taking a current which is not steady. The current taken is not steady because a large current flows just before each transistor is turned off.

The output from secondary winding S1 is utilised as the heater current for the cathode ray tube heater electrodes.

The secondary winding S2 is centre tapped and the output across the winding is rectified by diodes D2 and D3. The output is passed through an RC smoothing circuit to terminal −V3 and through another RC smoothing circuit and a stabilizing circuit comprising zener diode ZD1 to terminal −V1. The voltages at terminals −V1 and −V3 are both negative with respect to terminal E′; and the voltage at terminal −V3 is negative with respect to the voltage at terminal −V1. Terminals E′, −V3 and −V1 are connected to similarly referenced terminals on FIGURE 6.

The output of secondary winding S3 is fed to the primary winding of a transformer TR2. The transformer TR2 is fitted to reduce the pickup of the converter waveform on the supply voltage being produced. The secondary winding of transformer TR2 is connected via a bridge rectifier, an RC smoothing circuit and a voltage stabilizing circuit comprising zener diode ZD2, to terminal −V2 and +V2. The terminals −V2 and +V2 are connected to correspondingly referenced terminals on FIGURE 5 to provide the power supply for the oscillator circuit.

The output from secondary winding S4 of transformer TR1 is fed via voltage doubling and potentiometer networks to provide the H.T. supply for the cathode ray tube. Terminal A1 is connected to anodes 1 and 3, terminal A2 to anode 2, terminal CA to the cathode and terminal G to the grid of the cathode ray tube (not shown).

The operation of the apparatus to test a geophone will now be described. A battery is connected between terminals −V4 and E (FIGURE 7) and switch S4 is closed. The geophone is connected between terminals 14 (FIGURE 6) the geophone being placed in its normal upright operating position, and switch SW3 is set to the L position. The oscillator frequency is set to the nominal natural frequency ($f_0$) of the geophone and the output is adjusted to produce a trace on the cathode ray tube. The trace height is reduced by adjusting variable resistors R1A and R1B, at the same time increasing the oscillator output, until a distorted crescent moon appears on the screen. The values of variable resistors R1B and R1C are then adjusted until the horns are of equal length. The trace then appears as in FIGURE 3c. The frequency of the oscillator is adjusted to close the crescent into a single line. The trace then appears as in FIGURE 3b. Variable resistor R1C is again adjusted to make the horns of equal length. The trace then appears as in FIGURE 3a. The frequency and impedance settings are then noted.

The procedure is then repeated with switch SW3 in the R position and with the oscillator output unchanged. Little or no difference in the frequency corresponding to the balance point will be found but there may be a difference in the setting of variable resistors R1B and R1C at the balance point. The average of the two readings gives the geophone impedance ($Z_0$).

The complete procedure is repeated with the oscillator frequency set to the nominal upper resonant frequency ($f_1$) to obtain the other impedance ($Z_1$).

Some typical limits for the four parameters measured are given in the table below:

|  | $f_0$ (c./s.) | $f_1$ (c./s.) |  | $Z_0$ (ohms) | $Z_1$ (ohms) |
|---|---|---|---|---|---|
| Two particular refraction geophones. | 2.9–3.3 | 11.5–13.0 | ---------- | 1,000–1,200 | 385–415 |
|  | 1.75–2.0 | 24.5–27.0 | ---------- | 400–480 | 155–170 |
| Two particular reflection geophones. | 19.0–21.0 | 95–110 | For 1 | 100–120 | 83–93 |
|  |  |  | For 6 | 600–720 | 500–560 |
|  | 19.0–21.0 | 135–150 | For 1 | 165–190 | 117–127 |
|  |  |  | For 6 | 1,000–1,150 | 700–760 |

With the above described test the natural frequency ($f_0$) of the geophone is given directly. The value of the upper resonant frequency ($f_1$) gives a good indication of the sensitivity of the geophone. The impedance ($Z_0$) at the natural frequency is a measure of the damping of the geophone. The impedance ($Z_1$) at the upper frequency gives an indication of the coil resistance, shunted by the damping resistor.

The apparatus can be used to measure resistance values by connecting the resistor to be tested as if it were a geophone.

Reflection type geophones are commonly used in series connected strings. A string of geophones can be tested as if it were one geophone using the same frequency limits and multiplying the impedance limits by the number of geophones. Parallel connected geophones must be unsoldered from a string and tested individually.

Although in the above description reference has been made specifically to the testing of geophones, it should be appreciated that the apparatus can be used for testing any transducer which utilises the effect of relative movement between a coil and a magnet.

I claim:
1. Apparatus for testing transducers having resonant characteristics comprising a test network having input terminals for connection to and adjustable frequency source of a fundamental excitation signal and having a plurality of interconnected branches, including a first branch having adjustable resistance, a second branch having terminal means arranged to be connected with a transducer to be tested, and third and fourth branches connected respectively with said first and second branches, said third and fourth branches each including means for introducing a small harmonic distortion in the fundamental signal developed across the adjustable resistance and transducer, respectively, resulting from said fundamental excitation; means connected to said test network for simultaneously and differentially adding said fundamental and harmonic signals in each branch to produce a network output which is a function of the sum of said distorted signals, including the fundamental and harmonic components thereof, said source and branches being interconnected whereby adjustment of said source and adjustable resistance controls the relative amplitudes of said fundamental and harmonic components, and indicating means responsive to said adding means for indicating the signal content of said output whereby said source frequency and said adjustable resistance can be substantially independently adjusted to produce a balanced condition in said network in which the output thereof consists only of said harmonic components when said source frequency is substantially equal to a resonant frequency of said transducer and the value of said variable resistance is substantially equal to the impedance of said transducer at said resonant frequency.

2. Apparatus as claimed in claim 1 wherein said indicating means responsive to the output of said adding means is in the form of a cathode ray tube having deflection circuits.

3. Apparatus as claimed in claim 2 wherein the output from said adding means is operatively connected to one of said deflection circuits of the cathode ray tube and said adjustable frequency source is coupled to the other of said deflection circuits of the cathode ray tube, whereby, in use, the resultant of the summing of the distorted voltages is depicted in the form of Lissajous figures on the screen of the cathode ray tube.

4. Apparatus as claimed in claim 2 including time base generating means and wherein the output from said adding means is connected to one of said deflection circuits of the cathode ray tube and said time base generating means is connected to the other of said deflection circuits, whereby, in use, the resultant of the summing of the distorted voltages is depicted as a function of time on the screen of the cathode ray tube.

5. Apparatus as defined in claim 1 in which said first and second branches have a common terminal and are serially connected across said source and wherein said distorting means comprise a dual channel amplifier, each channel being connected for energization by the respective branch and including means for operating the amplifier in the non-linear region of its characteristics.

6. Apparatus as defined in claim 1 wherein said distorting means comprise non-linear amplifier means in each of said third and fourth branches.

7. Apparatus as claimed in claim 6 wherein said adding means comprise a circuit for differentially interconnecting said non-linear amplifier means and further including bias means for producing said harmonic distortion in the operation of each amplifier means.

References Cited by the Examiner
UNITED STATES PATENTS

| 2,162,009 | 6/1939 | Goldsmith | 324—34 |
| 2,324,215 | 7/1943 | Kinsburg | 324—57 |
| 2,340,609 | 2/1944 | Mestas | 324—57 X |
| 2,371,636 | 3/1945 | McConnell | 324—62 |
| 2,566,699 | 9/1951 | Frommer | 324—88 X |
| 2,648,979 | 8/1953 | Cornett | 324—88 X |
| 3,132,307 | 5/1964 | Augustine et al. | 330—69 X |

FOREIGN PATENTS 22,266 11/1961 Germany.

WALTER L. CARLSON, *Primary Examiner.*
E. E. KUBASIEWICZ, *Assistant Examiner.*

UNITED STATES PATENT OFFICE
CERTIFICATE OF CORRECTION

Patent No. 3,286,170                           November 15, 1966

Bryan Albert Palmer

It is hereby certified that error appears in the above numbered patent requiring correction and that the said Letters Patent should read as corrected below.

Column 2, line 55, for "21" read -- R1 --; column 6, line 6 for "windings F1 and F2 of the transforme TR1" read -- a primary winding P1 of a transformer TR1 --; line 8, for "TH1" read -- TR1 --.

Signed and sealed this 24th day of October 1967.

(SEAL)
Attest:

Edward M. Fletcher, Jr.                          EDWARD J. BRENNER
Attesting Officer                                Commissioner of Patents